ASAHEL DAVIS.
Improvement in Dovetailing Machines.
No. 121,278.  Patented Nov. 28, 1871.
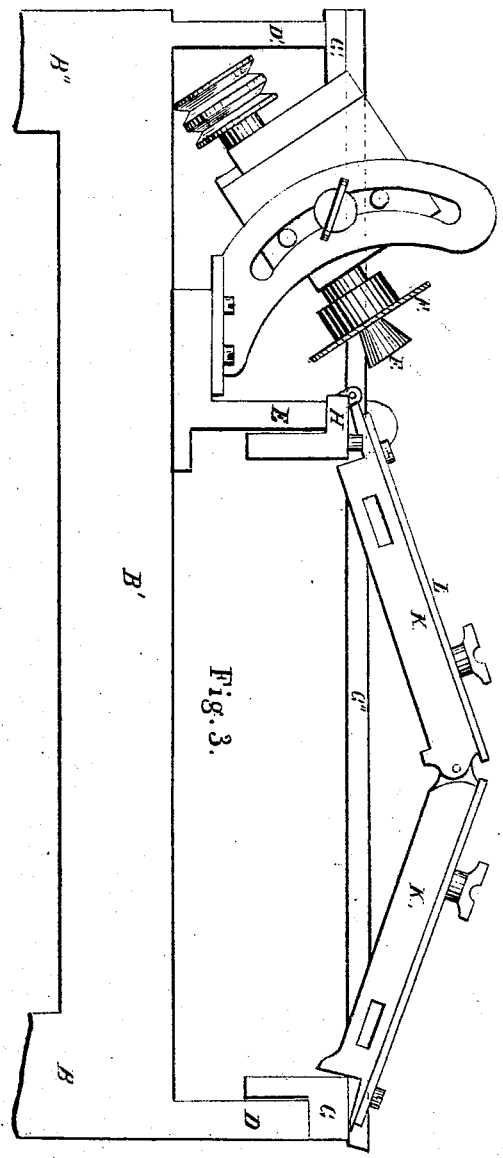
Fig. 3.
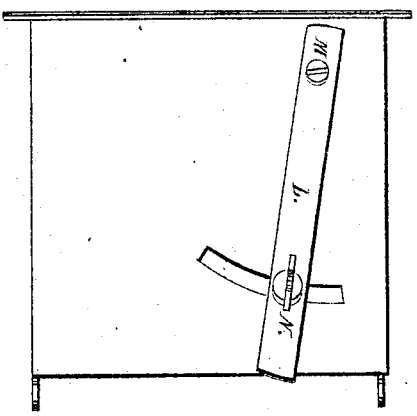
Fig. 4.
Fig. 1.
Fig. 2.
Witnesses.
Nathaniel Hill Jr.
T. W. Pressey
Inventor.
Asahel Davis 121,278

UNITED STATES PATENT OFFICE.

ASAHEL DAVIS, OF LOWELL, MASSACHUSETTS.

IMPROVEMENT IN DOVETAILING-MACHINES.

Specification forming part of Letters Patent No. 121,278, dated November 28, 1871.

*To all whom it may concern:*

Be it known that I, ASAHEL DAVIS, of Lowell, in the county of Middlesex and of the State of Massachusetts, have invented an Improvement in Dovetailing-Machines of which the following is a specification:

My invention relates to the necessary machinery to produce the beveled dovetailed joint embodying my invention; and consists in the combination, with the rails and carriage forming the feed mechanism, and the cutters and saws for cutting the dovetailed tongue or groove and the adjacent shoulders, of a table and rest to place the board upon and against, so arranged that the joint may be cut to any desired angle with one of the principal surfaces, and also to any desired angle with one of the edges of the board.

Figures 1 and 2 are, respectively, a plan and elevation of a piece of flared dovetailed joining, embodying the first part of my invention. Fig. 3 is an end elevation of the working parts and a portion of the frame of the machine for producing the flared dovetailed joint, embodying the second part of my invention. Fig. 4 is a top view of one of the hinged tables, showing the rest seen edgewise in the elevation.

The dovetailed joint is shown at A A', Fig. 1. The particular angle at which the boards join is not claimed, nor do I limit myself to the particular angle of flare shown in Fig. 2, or to the form of dovetail shown, nor to any particular form of work within range of the capacity of the machine, and exclude from my claim only miter dovetailed work, which has long been known. B B' B'' is the upper portion of the frame of the machine; D D' being the fixed rails, and E a slide rail moving toward or from the fixed rail D, its ends resting on the frame of the machine. The frame here shown is the same as that of the A. and A. Davis miter dovetailing machine, patented February 26, 1856. F F' are the cutters for cutting the dovetailed groove, and arranged to be set at any desired angle. G is an arm of the carriage resting on the fixed rail D. H is a sliding arm resting on the sliding rail E. G' is an arm of the carriage resting on the rail D' and connected with the arm G by the bar G''. K K' are tables adjustable to any desired angle by moving the sliding rail E toward or from the fixed rail D, carrying with it the sliding arm H. The rail E may be moved by a rack and gear, or by a screw or other suitable means. L L, Figs. 3 and 4, is the rest, pivoted at M, and secured in position by the screw N. The carriage and tables move along the rails D D' H past the revolving cutters F F'. The tables and rest having been adjusted to the proper angles, the board to be operated upon is placed on the table with an end projecting beyond the line of the cutters, and with an edge against the rest, and secured by the hand of the operator, or other suitable means, when the carriage is moved along the rails past the revolving cutters, and one side of the flared dovetailed joint is produced as desired. The other side is produced by the cutters, (not shown in the drawing,) attached to the frame of the machine adjacent to the lower edge of the other table, the board being placed on that table, and operated in a manner similar to that described.

For convenience I have adapted my invention to the A. and A. Davis miter dovetailing machine. It is obvious that the cutters may be made adjustable, and the table remain fixed or the top of the carriage may then serve as a table, or the cutters may remain fixed in position and the tables be made adjustable, or the tables may be disconnected and made separately adjustable to the adjacent cutters, or a single table may be made adjustable to either set of cutters, as desired. The cutters for either the dovetailed tongue or groove may be attached to other frame-work than that of the A. and A. Davis dovetailing machine, and a suitable table arranged in connection, to accomplish the same object, or finally, the cutters may be made either fixed or adjustable, and to move past the board placed on a table, either adjustable or fixed, and accomplish the same object as in the arrangement I have chosen, without departing from my invention.

I do not limit myself to the particular arrangement of cutters shown. I use in practice, three cutters on separate arbors for cutting the dovetailed groove. It is apparent that a board without flare may be joined to a flared board, or that two boards of different flares may be joined by this method, and my invention relates to these cases.

I do not claim as new, the miter dovetailed joint, nor the machine for producing that joint; but I do claim—

The adjustable tables K K′ provided with gauge L, in combination with the adjustable cutters F F′, and a suitable carriage and supporting frame, constructed substantially as herein shown and described.

ASAHEL DAVIS.

Witnesses:
 NATHANIEL HILL, Jr.,
 E. F. DAVIS.

(173)